Figures 1, 2:
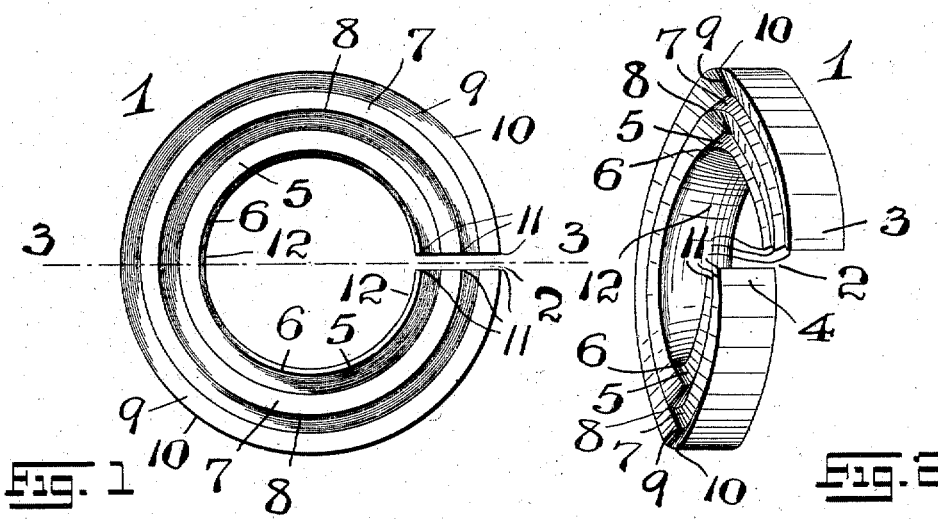

C. F. BEERS.
LOCK WASHER.
APPLICATION FILED MAY 21, 1910.

985,772.

Patented Mar. 7, 1911.

WITNESSES:
Fredk H. W. Fraentzel
Harry E. Pfeiffer

INVENTOR:
Charles F. Beers,
BY
Fraentzel and Richards.
ATTORNEYS

UNITED STATES PATENT OFFICE.

CHARLES F. BEERS, OF NEWARK, NEW JERSEY.

LOCK-WASHER.

985,772.  Specification of Letters Patent.  Patented Mar. 7, 1911.

Application filed May 21, 1910. Serial No. 562,617.

*To all whom it may concern:*

Be it known that I, CHARLES F. BEERS, a citizen of the United States, residing at Newark, in the county of Essex and State of New Jersey, have invented certain new and useful Improvements in Lock-Washers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in nut-locks; and, the present invention has reference, more particularly, to improvements in a novel lock-washer, for use with bolts and nuts of the various kinds.

The present invention has for its principal object to provide a novel lock-washer which is split and is formed with oppositely projecting spring-members, said lock-washer being provided upon one of its side-faces with a plurality of concentric ribs, the apex of the inner rib, formed at the inner circumference of said lock-washer, being higher than the apex of the middle rib; and, the apex of said middle rib being in turn higher than the apex of the outer rib formed at the outer circumference of said lock-washer, the said ribs thus formed and graded as to their respective heights with relation to each other, providing a most positive holding or biting relation of the washer with the surfaces of the nuts and other parts against which said lock-washer is arranged. As thus arranged, each rib has an independent biting action, the inner rib taking hold of the nut or other surface presented to it first, followed successively by the biting action of the middle and outer ribs, respectively; and, in this manner a stronger friction or gripping action of the lock-washer, as a whole, is provided, than if the said ribs were all of one height and biting together, since a greater resistance is offered to the biting action of the said ribs than if they all bite at the same moment.

A further object of the present invention is to provide the inner circumference of said lock-washer with a convex or rounded surface, which prevents any sharp edges of said washer from engaging the screw-threads of a bolt with which it may be used, and marring or otherwise injuring said thread. The rounded surface of the inner edge of said lock-washer presents a non-abrasive or cutting surface to the screw-thread of a bolt with which said lock-washer is used.

The present invention consists, therefore, in the novel lock-washer hereinafter more particularly described, and then finally embodied in the clauses of the claim which are appended to and which form an essential part of this specification.

Figure 3:
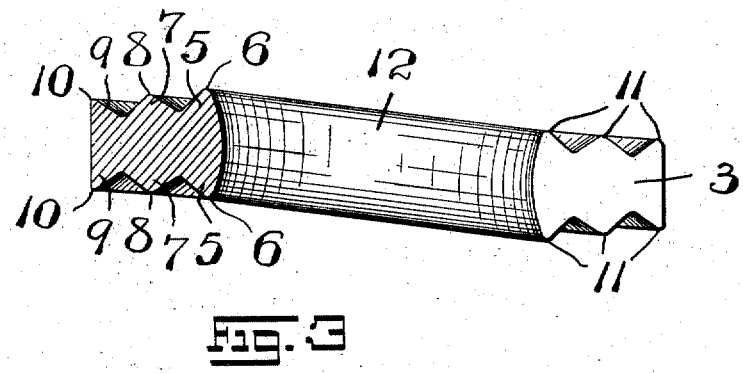

The invention is clearly illustrated in the accompanying drawings, in which:

Figure 1 is a plan view of said novel lock-washer embodying the principles of the present invention; Fig. 2 is an edge view of the same in perspective; and Fig. 3 is a transverse section of the lock-washer, said section being taken on line 3—3 in said Fig. 1.

Similar characters of reference are employed in the above described views, to indicate corresponding parts.

Referring now to the several figures of the drawings, the reference-character 1 indicates the lock-washer, constructed in accordance with the principles of this invention. The body of said lock-washer is made of spring-steel properly tempered and is spiral in form. The said lock-washer is provided with an opening 2 so as to provide the free end-portions 3 and 4. The said lock-washer body is provided, on either one or both of its flat or side-faces, with a plurality of concentric ribs, preferably three in number, the said ribs being angular in cross-section, with their apexes presented outwardly from the face or faces of said lock-washer body. The concentric rib 5, which is formed at the inner circumference or marginal edge of the body of said lock-washer, is provided with an apex 6, the middle concentric rib 7 being provided with an apex 8; and, the concentric rib 9, which is formed at the outer circumference or marginal edge of the body of said lock-washer, being provided with an apex 10. The apex 6 of said inner concentric rib 5 is presented at a higher plane than the apex 8 of said middle concentric rib 7; and, in like manner, the apex 8 of said middle concentric rib 7 is presented at a higher plane than the apex 10 of said outer concentric rib 9. As thus arranged, in their relation with each other, the said ribs form friction or biting elements upon the flat or side-faces of the body of said lock-washer, and when the lock-washer 1 is operatively arranged upon a bolt, between a nut and other surface, the free ends 11 of the respective concentric ribs first bite into the said nut and other surface, due to the spiral formation of said lock-washer body; but, as said lock-washer body straightens itself under the pressure of the nut, the apex 6 of the inner concentric rib 5 first bites into the nut and other surface, followed upon the further tightening or screwing up of said nut, by a similar biting action of the apex 8 of said middle concentric rib 7; and, finally, by the apex 10 of the outer concentric rib 9, which bites into the nut and other surface. As will be clearly evident, this action is found very effective in establishing a strong frictional engagement between the body of said lock-washer and the nut and other surface engaged thereby, and very effectively prevents the nut from loosening upon its bolt by vibration or other accidental cause. The said lock-washer while preferably provided upon its flat or side-faces with three ribs, may be provided with more ribs, if desired, and it is not the purpose of the present invention to limit the invention merely to the specific provision of three of said concentric ribs. The inner vertical edge or circumference of said lock-washer 1 is provided with a convex or rounded portion or surface 12, being constructed so as to prevent any sharp edges or abrasive surface-portions upon said lock-washer from coming in contact with the screw-threads of a bolt upon which said lock-washer may be arranged, therefore, serving as a protection against marring, cutting, or otherwise injuring the said screw-threads by contact with the lock-washer.

From the foregoing description of the present invention, it will be clearly seen, that I have provided a simply constructed and efficient lock-washer which is admirably adapted for use on railway rails, automobiles, vehicles, and machinery of all kinds which are subject to vibration. Said lock-washers may also be made of various sizes and are adapted for various uses to which they may be put.

I claim:

1. A lock-washer comprising a spirally shaped body having free ends, said body being provided with a plurality of concentric ribs having outwardly presented apexes, the heights of said outwardly presented apexes of said concentric ribs tapering from points near the inner marginal edge of the lock-washer to the outer marginal edge of said lock-washer, and the concentric rib formed at said inner marginal edge being of the greatest height.

2. A lock-washer comprising a spirally shaped body formed with free ends, concentric ribs having outwardly presented apexes upon the side-faces of said lock-washer, the apex of said concentric rib formed at the inner marginal edge of said lock-washer being of the greatest height and the apex of said concentric rib formed at the outer marginal edge of said lock-washer being of the least height.

3. A lock-washer comprising a spirally shaped body formed with free ends, concentric ribs having outwardly presented apexes upon the side-faces of said lock-washer, the apex of said concentric rib formed at the inner marginal edge of said lock-washer being of the greatest height, and the apex of said concentric rib formed at the outer marginal edge of said lock-washer being of the least height, and the inner vertical edge of said spirally shaped body being provided with a convex portion extending between its lateral sides.

In testimony, that I claim the invention set forth above I have hereunto set my hand this 19th day of May, 1910.

CHARLES F. BEERS.

Witnesses:
GEORGE D. RICHARDS,
FREDK. H. W. FRAENTZEL.

Copies of this patent may be obtained for five cents each, by addressing the "Commissioner of Patents, Washington, D. C."